US009391810B2

(12) United States Patent
Sterman et al.

(10) Patent No.: US 9,391,810 B2
(45) Date of Patent: Jul. 12, 2016

(54) SYSTEMS AND METHODS FOR COMMUNICATING A STREAM OF DATA PACKETS VIA MULTIPLE COMMUNICATIONS CHANNELS

(75) Inventors: Baruch Sterman, Efrat (IL); Chakrapani Gorrepati, Morganville, NJ (US)

(73) Assignee: VONAGE BUSINESS INC., Atlanta, GA (US)

( * ) Notice: Subject to any disclaimer, the term of this patent is extended or adjusted under 35 U.S.C. 154(b) by 0 days.

(21) Appl. No.: 13/561,697

(22) Filed: Jul. 30, 2012

(65) Prior Publication Data

US 2014/0029605 A1  Jan. 30, 2014

(51) Int. Cl.
*H04L 12/66* (2006.01)
*H04L 29/06* (2006.01)
*G06Q 10/06* (2012.01)
*G06Q 50/32* (2012.01)

(52) U.S. Cl.
CPC ............... *H04L 12/66* (2013.01); *G06Q 10/06* (2013.01); *G06Q 50/32* (2013.01); *H04L 65/1069* (2013.01); *H04L 69/14* (2013.01); *H04L 63/0428* (2013.01)

(58) Field of Classification Search
USPC .......................... 709/231, 238; 370/280, 354
See application file for complete search history.

(56) References Cited

U.S. PATENT DOCUMENTS

| 6,738,910 | B1 | 5/2004 | Genty et al. |
| 7,002,995 | B2 | 2/2006 | Chow et al. |
| 7,558,247 | B2 | 7/2009 | Lee et al. |
| 7,830,864 | B2 | 11/2010 | Li |
| 7,970,900 | B2 | 6/2011 | Holden et al. |
| 7,974,243 | B2 | 7/2011 | Nagata et al. |
| RE43,051 | E | 12/2011 | Newman et al. |
| 8,165,090 | B2 | 4/2012 | Nix |
| 8,239,960 | B2 | 8/2012 | Frattura et al. |
| 8,375,139 | B2 | 2/2013 | Riggert et al. |
| 8,458,349 | B2 | 6/2013 | Brunell et al. |

(Continued)

FOREIGN PATENT DOCUMENTS

EP    2 224 668 A1    1/2010

OTHER PUBLICATIONS

U.S. Appl. No. 13/561,391 filed Jul. 30, 2012, entitled "Systems and Methods for Preventing the Examination of Data Packet Contents".

(Continued)

*Primary Examiner* — Andrew Lai
*Assistant Examiner* — Jamaal Henson
(74) *Attorney, Agent, or Firm* — Nixon & Vanderhye, P.C.; Joseph Pagnotta

(57) ABSTRACT

Systems and methods of preventing an Internet service provider from identifying a stream of data packets as carrying a voice over Internet protocol telephony communication can make use of encryption techniques to prevent the Internet service provider from examining the content of the data packets. Also, multiple communications channels may be established between a telephony device and elements of an IP telephony system. A stream of data packets bearing the media of an IP telephony communication is then separated into sub-streams, and each sub-stream is sent through a different one of the communications channels. This prevents an Internet service provider from identifying a stream of data packets as bearing the media of an IP telephony communication based on a pattern in the data traffic.

40 Claims, 16 Drawing Sheets

(56) References Cited

U.S. PATENT DOCUMENTS

| | | |
|---|---|---|
| 8,615,008 B2 | 12/2013 | Natarajan et al. |
| 8,769,046 B2 | 7/2014 | Knapp et al. |
| 2005/0086699 A1 | 4/2005 | Hahn et al. |
| 2005/0163093 A1 | 7/2005 | Garg et al. |
| 2006/0098637 A1 | 5/2006 | Peltz et al. |
| 2006/0218298 A1* | 9/2006 | Knapp .................... H04L 45/00 709/238 |
| 2009/0100495 A1* | 4/2009 | Manapragada ....... H04L 65/607 725/138 |
| 2009/0310578 A1 | 12/2009 | Convertino et al. |
| 2009/0323632 A1* | 12/2009 | Nix ....................... H04L 29/125 370/331 |
| 2010/0287274 A1* | 11/2010 | Martinez ............... H04L 65/602 709/224 |
| 2010/0287296 A1* | 11/2010 | Riggert et al. ................. 709/231 |
| 2010/0296521 A1* | 11/2010 | Martinez et al. .............. 370/468 |
| 2010/0311452 A1 | 12/2010 | Li et al. |
| 2011/0093902 A1 | 4/2011 | De Los Reyes et al. |
| 2011/0119565 A1* | 5/2011 | Chang ............... H03M 13/1515 714/776 |
| 2011/0194692 A1 | 8/2011 | Carpenter et al. |
| 2011/0235650 A1* | 9/2011 | Martinez et al. ............. 370/419 |
| 2011/0235651 A1* | 9/2011 | Martinez et al. ............. 370/419 |
| 2011/0264818 A1* | 10/2011 | Riggert .................. H04L 47/18 709/231 |
| 2011/0271002 A1* | 11/2011 | Martinez et al. .............. 709/231 |
| 2011/0274265 A1 | 11/2011 | Fan |
| 2011/0320625 A1* | 12/2011 | Riggert et al. ................. 709/231 |
| 2012/0113899 A1 | 5/2012 | Overmars |
| 2012/0202548 A1 | 8/2012 | Lee et al. |
| 2013/0003683 A1 | 1/2013 | Zhang et al. |
| 2013/0263202 A1 | 10/2013 | Bull et al. |
| 2013/0268357 A1 | 10/2013 | Heath |
| 2014/0029476 A1 | 1/2014 | Sterman et al. |
| 2014/0029523 A1 | 1/2014 | Sterman et al. |
| 2014/0029606 A1 | 1/2014 | Sterman et al. |

OTHER PUBLICATIONS

U.S. Office Action mailed May 28, 2013 in U.S. Appl. No. 13/561,391.
U.S. Office Action mailed Feb. 20, 2014 in U.S. Appl. No. 13/561,486.
U.S. Office Action mailed Jan. 17, 2014 in U.S. Appl. No. 13/561,792.
Final Office Action mailed Jul. 7, 2014 in U.S. Appl. No. 13/561,486.
Final Office Action mailed Jul. 30, 2014 in U.S. Appl. No. 13/561,792.
Office Action mailed Oct. 2, 2014 in U.S. Appl. No. 13/561,618.
Final Office Action mailed Apr. 10, 2015 in U.S. Appl. No. 13/561,618.
Office Action mailed Jun. 25, 2015 in U.S. Appl. No. 13/561,486.
U.S. Patent and Trademark Office, Notice of Allowance, issued in connection with U.S. Appl. No. 13/561,618, dated Dec. 9, 2015.

* cited by examiner

SYSTEMS AND METHODS FOR COMMUNICATING A STREAM OF DATA PACKETS VIA MULTIPLE COMMUNICATIONS CHANNELS

BACKGROUND OF THE INVENTION

The invention is related to Internet protocol (IP) telephony systems that allow users to place and receive telephone calls, video calls, to send and receive text and video messages, and to send and receive other forms of telephony and data communications. Such communications are carried, at least in part, via data packets that are communicated over a data network. The data network is commonly the Internet.

Users of an IP telephony system typically gain access to the Internet using an Internet service provider so that they can communicate via the IP telephony system. Also, the IP telephony system itself typically makes use of one or more Internet service providers to connect telephony and data communications between its own clients, and to connect telephony and data communications between its clients and users of other telephony service providers.

Because of the recent growth in the use of the Internet for these and other purposes, some Internet service providers are having a difficult time handling the volume of data packet traffic being requested by their clients. To help resolve this problem, Internet service providers have begun limiting the bit rates of communications to and from certain entities. In addition, some Internet service providers have sought to prevent the transmission of certain forms of data communications that are viewed as using too much bandwidth.

For example, some Internet service providers make an effort to identify communications which carry the media of IP telephony communications. When they are successful in identifying a stream of data packets which is carrying the media of an IP telephony communication, they may slow down the transmission rate, or simply drop the data packets altogether. In either case, their actions harm the ability of an IP telephony system to provide high quality service to its customers. Thus, there is a need for systems and methods which can be used to prevent Internet service providers from identifying data packets which bear IP telephony communications so that the Internet service providers will not slow down or completely drop such data packets.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using Internet protocol data communications.

Figure 1:
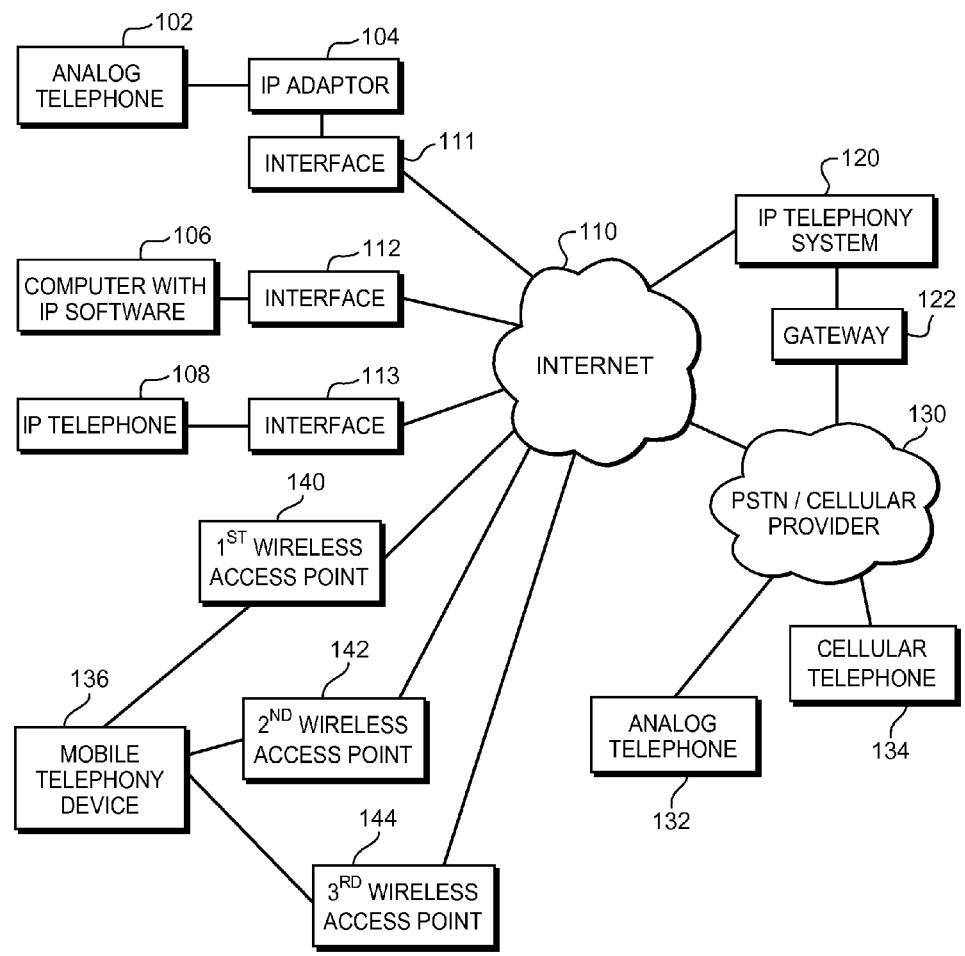
FIG. 1 is a diagram of a communications environment including various elements which are associated with an Internet protocol (IP) telephony system operating in accordance with the invention.

As illustrated in FIG. 1, a communications environment 100 is provided to facilitate IP enhanced communications. An IP telephony system 120 enables connection of telephone calls between its own customers and/or other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via one or more gateways 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows devices that are connected to the PSTN 130 to connect with devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110 by an interface 113. The interface 113 could be any of multiple devices that are used to obtain access to a data network, such as the Internet 110. In some embodiments, the IP telephone 108 could be connected to the interface 113 via a wired connection. In other instances, the IP telephone 108 could be connected to the interface 113 by a separate wireless router (not shown). In yet other instances, the interface 113 could include its own wireless router.

Alternatively, a customer could utilize an analog telephone 102 which is connected to the Internet 110 via an IP adapter 104, which is itself coupled to an interface 111 to the Internet. In some embodiments, the functions of the IP adaptor 104 and the interface 111 could be combined into a single unit. The telephone adapter 104 converts analog signals from the analog telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). The computer 106 is coupled to the Internet via an interface 112. The computer could have a wired or wireless connection to the interface 112. Also, in some embodiments, a separate wireless router (not shown) could be logically interposed between the computer 106 and the interface 112 to the Internet 110. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 (operating in accordance with PSTN protocols and using cellular technology) could also place a call to an IP telephony system customer. The connection would be established in a manner similar to the manner discussed above, but the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™. Such a device may act as a mobile telephony device once it is configured with appropriate application software.

FIG. 1 illustrates that a mobile telephony device 136 is capable of establishing a first wireless data connection with a first wireless access point 140, such as a WiFi or WiMax router. The first wireless access point 140 is coupled to the Internet 110. Thus, the mobile telephony device 136 can establish a VOIP telephone call with the IP telephony system 120 via a path through the Internet 110 and the first wireless access point 140.

FIG. 1 also illustrates that the mobile computing device 136 can establish a second wireless data connection with a second wireless access point 142 that is also coupled to the Internet 110. Further, the mobile computing device 136 can establish a third wireless data connection with a third wireless access point 144 that is also coupled to the Internet 110. Assuming the mobile telephony device 136 includes cellular telephone capabilities, the mobile telephony device 136 could also establish a data connection to the Internet 110, and then to the IP telephony system 120, via a data channel provided by a cellular service provider 130.

Although not illustrated in FIG. 1, the mobile telephony device 136 may be capable of establishing a wireless data connection to a data network, such as the Internet 110, via alternate means. For example, the mobile computing device 136 might link to some other type of wireless interface using an alternate communication protocol, such as the WiMax standard, or some other standard that is later developed. Also, the wireless access points 140, 142, 144 illustrated in FIG. 1 could operate using any standard that allows a data connection to a data network.

Figure 2:
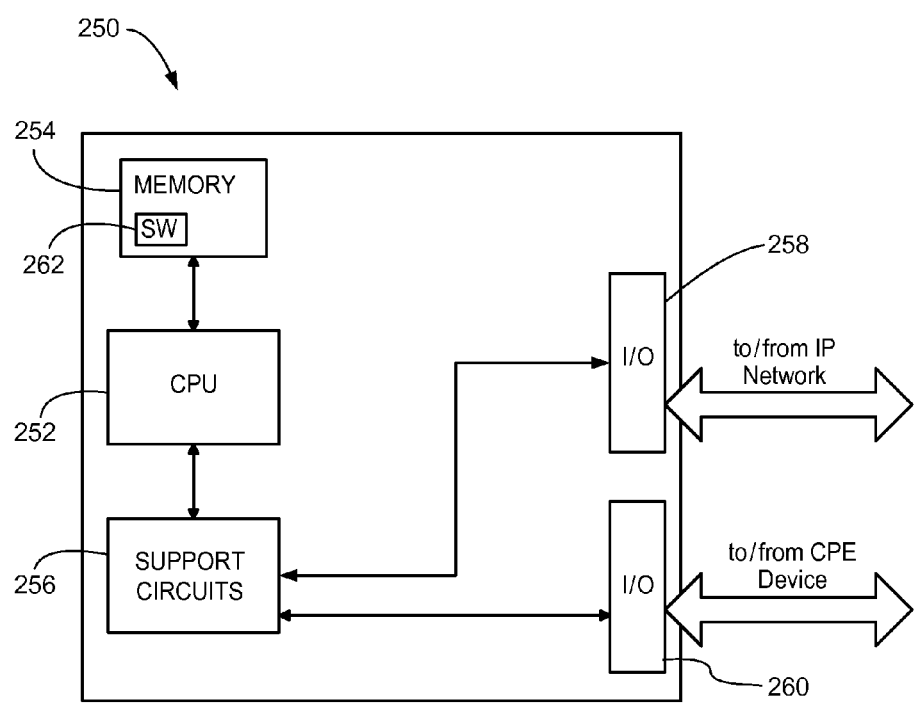
FIG. 2 is a block diagram of various elements of a processor that forms part of an IP telephony system operating in accordance with the invention.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the VOIP based telephony service 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to/from the data network 110 and gateways 122, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

The following description will refer to telephony communications. The term telephony communications is intended to encompass any type of communication that could pass back and forth between users of an IP telephony system. This includes audio and video telephone, text messages, video messages and any other form of telephony or data communication.

As mentioned in the Background Section, some Internet service providers have begun to make attempts to reduce the transmission speed of certain types of data packet communications that they view as consuming too much of their available bandwidth. Also, Internet service providers view some data packet communications, such as those that bear IP voice and video communications, as cutting to their revenue streams, because such IP based communications can replace voice and video communications carried via alternate means. As also mentioned above, some Internet service providers are completely dropping some data packets if they are determined to be carrying certain types of data communications. One of the common targets for these actions is data packets that are carrying the media of a telephony communication.

In order to take these actions, an Internet service provider must first determine which streams of data packets are carrying the media of a telephony communication. One way that this is accomplished is to examine the contents of a stream of data packets to determine if the format of the data packets corresponds to one of the typical formats which is used to carry the media of telephony communications.

Of course, it would be difficult to examine all of the data packets traversing an Internet service provider's network. Thus, an Internet service provider will usually focus on a stream of data packets that is being delivered to or that is being transmitted from a particular port of an interface device that is connected to the Internet. In most instances, the interface device will be assigned an Internet protocol address. Thus, the Internet service provider can focus on data packets being addressed to or which are issuing from a particular IP address and port number combination.

For purposes of the following description, the term "communications channel" will be used in some instances to refer to a combination of a pair of IP addresses and port numbers. Thus data packets traversing a "communications channel" may be data packets that are being delivered to or being transmitted from a particular port of an interface device that is assigned a particular IP address. Looked at another way, the data packets that are traversing a "communications channel" are the data packets that are addressed to or that are issuing from a particular IP address and port number combination.

In other instances, the term "communications channel" may refer to a data channel that has been established between a cellular telephony device and its cellular service provider. In still other instances, a "communications channel" may refer to a channel that is established between first and second IP telephony devices. The common theme is that a "communications channel" is established path between two endpoints, where a stream of data packets is being exchanged between those two endpoints.

If an Internet service provider wishes to know if the data packets traversing a communications channel are being used to carry the media of a telephony communication, the Internet service provider can examine the contents of the data packets passing over the communications channel to see if contents appear to have a format that is used to carry the media of a telephony communication. If this appears to be the case, the Internet service provider may decide to slow the transmission rate of the data packets traversing the communications channel. In other instances, the Internet service provider may simply stop delivering or transmitting the data packets.

Figure 3:
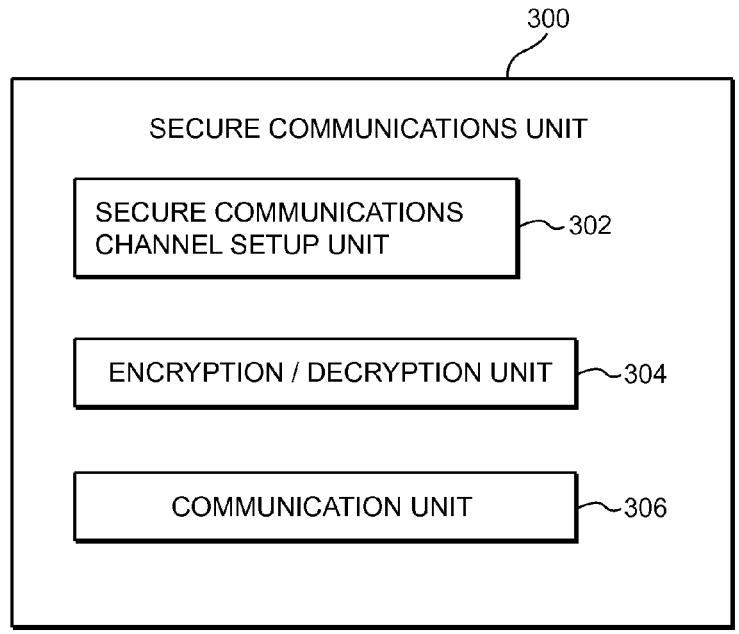
FIG. 3 is a block diagram illustrating elements of a secure communications unit which can form part of an IP telephony system operating in accordance with the invention.

FIG. 3 illustrates elements of a secure communications unit 300 which can be part of an element of an IP telephony system 120, or part of an IP telephony device that is used to establish telephony communications. The secure communications unit 300 makes it possible to prevent an Internet service provider from examining the contents of data packets that are traversing a communications channel so that the Internet service provider cannot determine if the data packets have a form that corresponds to a form typically used to carry the media of a telephony communication.

The secure communications unit 300 includes a secure communications channel setup unit 302 which is used to establish a secure communications channel. An example is a channel setup unit 302 that is configured to utilize the Hypertext Transfer Protocol Secure (HTTPS) communications protocol for secure communications over a computer or data network. The secure communications unit also includes an encryption/decryption unit 304 that encrypts data packets before they are sent, and which decrypts the data packets which have been received.

The HTTPS protocol provides for bidirectional encryption of communications between a client and a server, or in this case between an IP telephony device and a proxy server or media relay of an IP telephony system. Because the data packets are encrypted when they are sent over such a secure communications channel, an Internet service provider that examines the contents will be unable to verify that the data packets have a format corresponding to one of the typical formats used for telephony communications.

To make use of this scheme to prevent an Internet service provider from identifying data packets which are being used to carry the media of a telephony communication, a user's telephony device would have a secure communications unit 300, and the element or elements of an IP telephony system which are in communication with the user's IP telephony device would also include a secure communications unit 300. The secure communications channel setup units 302 on the user's IP telephony device and the element of the IP telephony system in communication with the user's IP telephony device would setup a secure communications channel during the signaling that is used to establish a new telephony communication. The encryption/decryption units 304 on both sides would then be used to encrypt and decrypt the data packets passing between the two devices.

Figure 15:
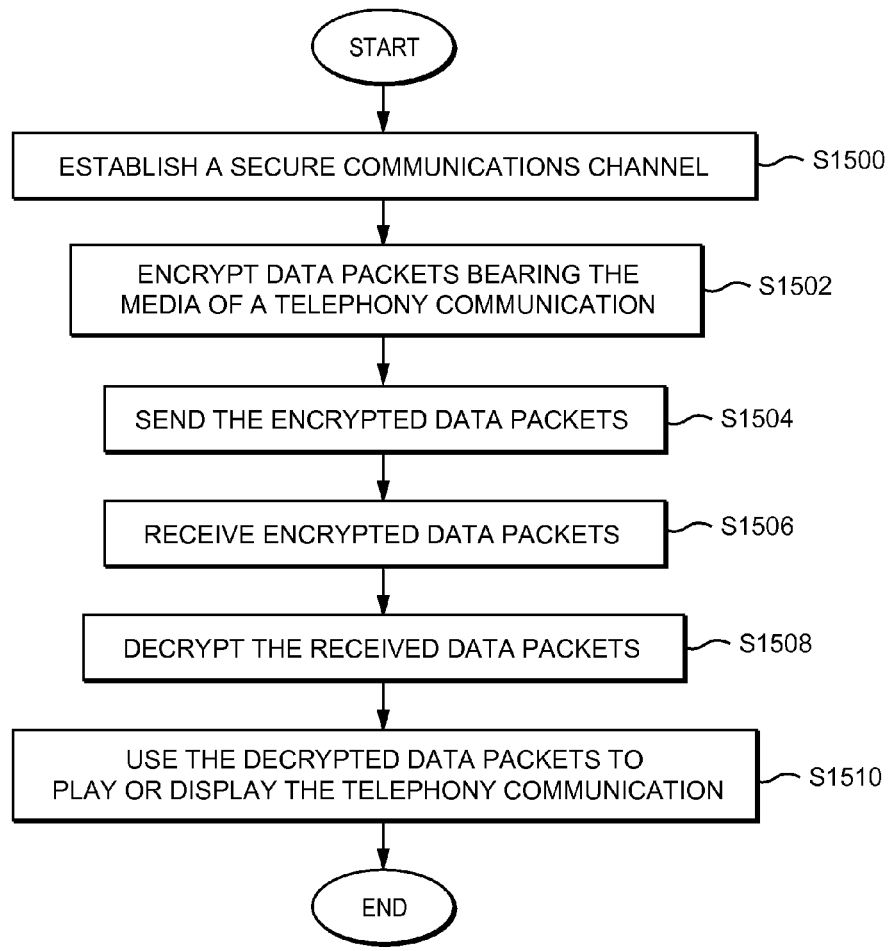
FIG. 15 is a flowchart illustrating steps of a method embodying the invention that would be performed by an IP telephony device to communicate over a secure communications channel.

FIG. 15 illustrates steps of a method that would be performed by a user's IP telephony device as part of this process. Referring to FIG. 15, in step S1500 the secure communications channel setup unit 302 on the user's device would establish a secure communications channel with an element of the IP telephony system. In step S1502, the encryption/decryption unit 304 on the user's device would encrypt a stream of data packets bearing the media of an outgoing telephony communication. In step S1504, those encrypted data packets would be sent to the IP telephony system.

In step S1506, the user's IP telephony device would receive an incoming stream of encrypted data packets from an element of the IP telephony system. In step S1508, the encrypted data packets would be decrypted by the encryption/decryption unit on the user's IP telephony device. Finally, in step S1510, the decrypted data packets would be used to play or display the received telephony communication to the user.

Figure 16:
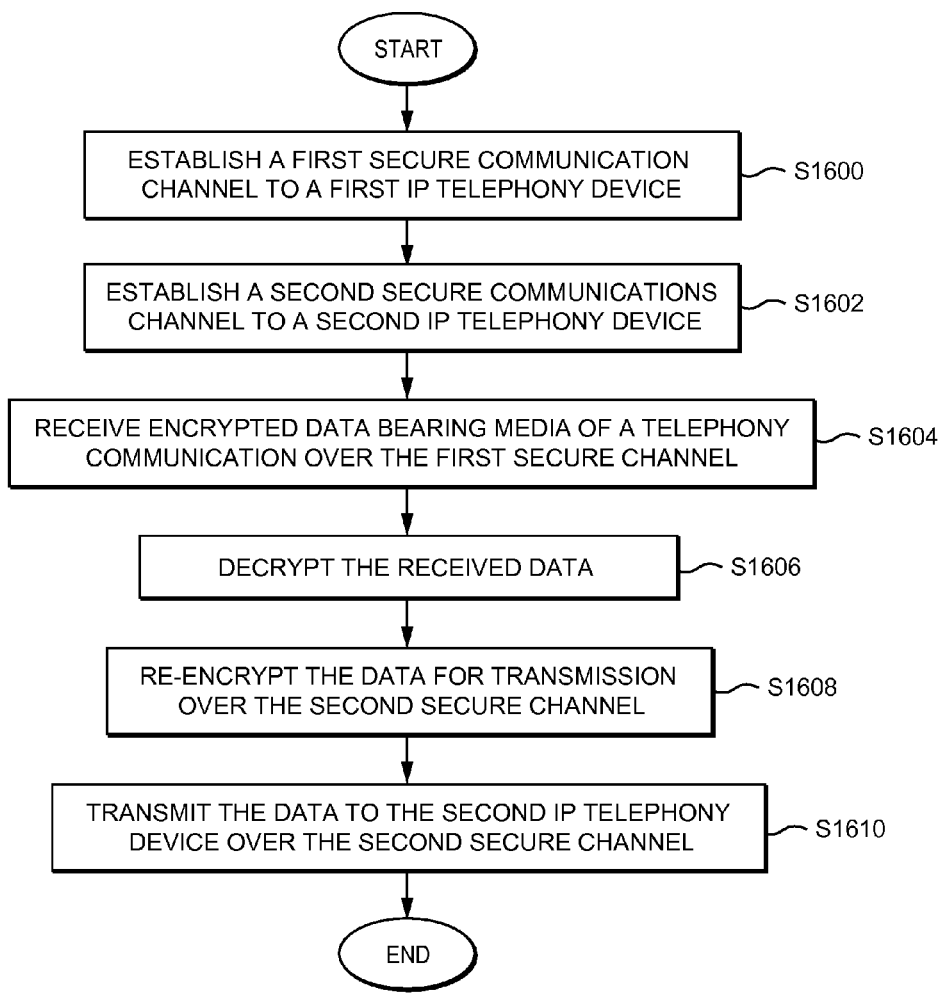
FIG. 16 is a flowchart illustrating steps of another method embodying the invention that would be performed by an element of an IP telephony system to facilitate secure telephony communications between two IP telephony devices.

In the method described above, where a user's telephony device is using a secure communications channel to communicate with an element of the IP telephony system, only a single encryption/decryption scheme is involved. However, an element of the IP telephony system that is acting as an intermediary to relay data packets between a calling party's IP telephony device and a called party's telephony device may need to establish separate first and second secure communications channels with the calling party's IP telephony device and the called party's IP telephony device, respectively. FIG. 16 is a flowchart illustrating steps that would be performed by an element of the IP telephony system to communicate with first and second IP telephony devices over separate secure communications channels.

The method begins in step S1600, when an element of an IP telephony system, such as a proxy server or a media relay, establishes a first secure communications channel with a first IP telephony device using its secure communications channel setup unit 302, as described above. Next, in step S1602, the element of the IP telephony system establishes a second secure communications channel with a second IP telephony device.

In step S1604 the element of the IP telephony system then receives encrypted data packets from the first IP telephony device over the first secure communications channel. In step S1606, the encryption/decryption unit 304 of the element of the IP telephony system decrypts the data packets using a first encryption/decryption scheme that has been established for the first secure communications channel. In step S1608, the encryption/decryption unit 304 then re-encrypts the data packets using an encryption scheme that has been established for use over the second secure communication channel. Finally, in step S1610, the element of the IP telephony system sends the re-encrypted data packets to the second IP telephony device over the second secure communications channel.

Methods as described above restrict an Internet service provider's efforts to examine the contents of data packets traversing a communications channel. However, it is still possible for an Internet service provider to monitor the data packet traffic traversing a communications channel and to determine the bit transmission rate. Also, an Internet service provider can examine the traffic to see if there is a bi-directional flow through the channel that would appear to indicate that the data packets are carrying the media of a telephony communication. For example, a voice over Internet protocol communication using the RTP protocol for a G711 codec will format each data packet with a voice payload size of 160 bytes, and transmit 50 packets per second. Identifying a data communications stream that follows this pattern may allow an Internet service provider to identity the communications stream as carrying a voice over Internet protocol communication, even though the Internet service provider cannot read the content of the data packet header or payload because of encryption.

Figure 4:
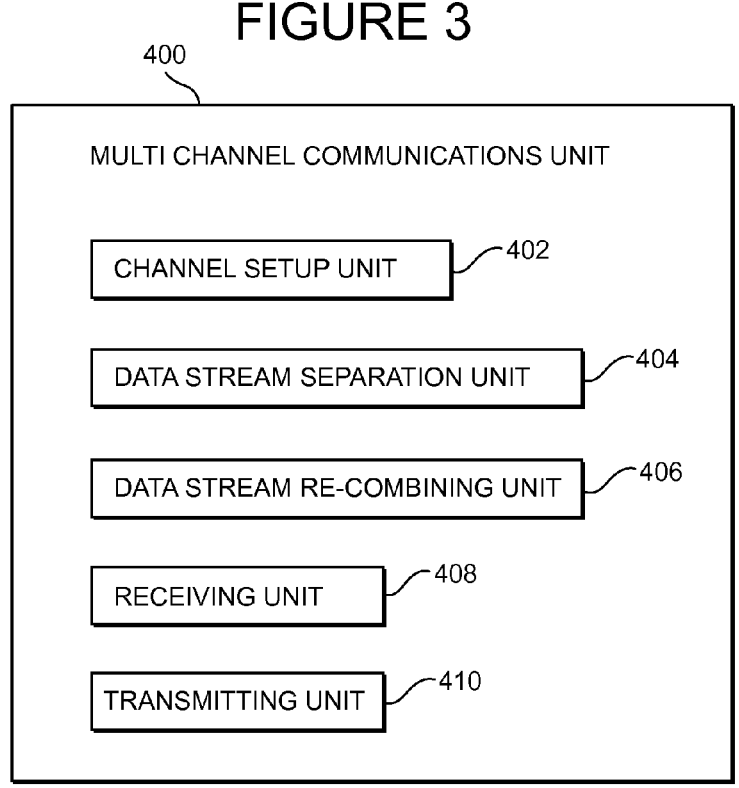
FIG. 4 is block diagram of elements of a multi-channel communications unit which can form a part of an IP telephony system operating in accordance with the invention.

FIG. 4 illustrates elements of a multi-channel communications unit 400 that can be used to prevent an Internet service provider from identifying a stream of data packets as carrying the media of a telephony communication via the examination of the transmission patterns and bit transmission rates. As illustrated, the multi-channel communication unit 400 includes a channel setup unit 402, a data stream separation unit 404, a data stream re-combining unit 406, a receiving unit 408 and a transmitting unit 410. These elements are explained in detail below.

The basic concept is to take a stream of data packets that contain the media of a telephony communication, and to break the stream up into multiple sub-streams. Each of the sub-streams is then sent through a different communications channel.

In some embodiments, substantially the same amount of data is sent through each of the channels. This means that each communications channel will be carrying a bit rate that does not correspond to the bit rate of typical telephony communications. This alone may be sufficient to prevent an Internet service provider from identifying a stream of data packets being carried over a communications channel as containing the media of a telephony communication.

In other embodiments, the rate at which a sub-stream of data packets traverse each communication channel may be selectively varied over time, or randomized, so that it does not appear that there is a relatively constant flow of data traffic over any of the communication channels. This can further serve to prevent the Internet service provider from identifying the flow of data packets over a communications channel as bearing the media of a telephony communication.

Figure 5:
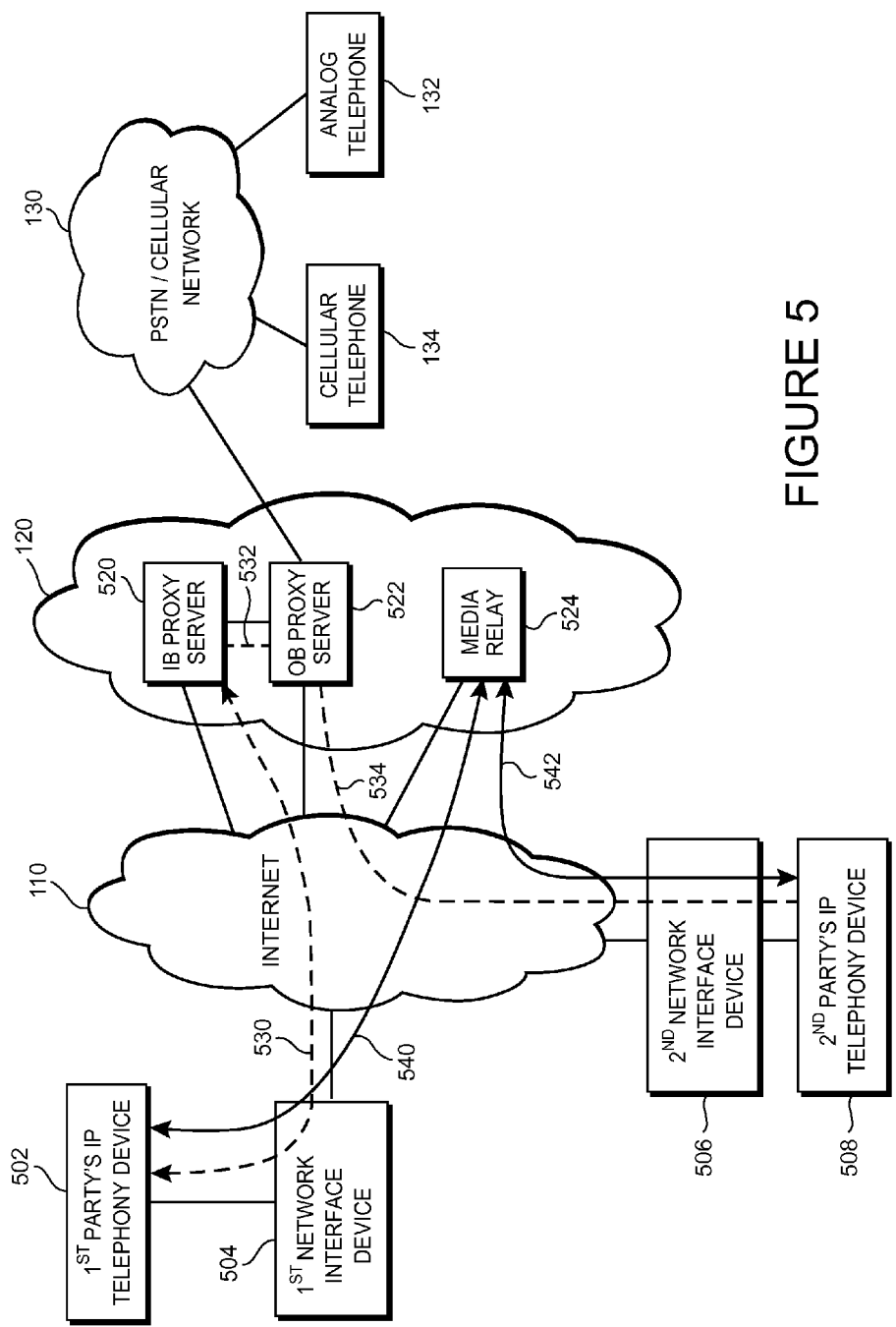
FIG. 5 is a diagram illustrating the paths that call setup signaling and media can take when an IP telephony communication is established with an IP telephony device.

To facilitate a discussion of how this is accomplished, a discussion of how IP telephony communications are setup and conducted will first be provided with reference to FIG. 5. Assume that a user wishes to use a first IP telephony device 502 to conduct a telephone call with a user of a second IP telephony device 508. Note, the first IP telephony device 502 is coupled to the Internet 110 via a first data network interface device 504. Also, the second IP telephony device 508 is coupled to the Internet via a second data network interface device 506. As explained above, the data network interface devices 504, 506 could be any of multiple different types of devices.

Call setup signaling, represented by dashed line 530 would pass back and forth between the first IP telephony device 502 and an inbound proxy server 520 of the IP telephony system 120, traversing a path that includes the first network interface 504 and the Internet 110. Call setup signaling, represented by dashed line 532 would also pass back and forth between the inbound proxy server 520 and an outbound proxy server 522 of the IP telephony system 120, which is capable of communicating with the second IP telephony device 508. Call setup signaling, represented by dashed line 534 would also pass back and forth between the outbound proxy server 522 and the second IP telephony device 508, traversing a path that includes the Internet 110 and the second network interface device 506.

If the call setup is successful, data packets bearing the media of the call may continue to traverse the path identified by the dashed lines 530, 532, 534 for the duration of the call. Alternatively, the first IP telephony device 502 and the second IP telephony device 508 may be instructed to communicate data packets bearing the media of the call through a media relay 524 of the IP telephony system 120. In that instance, the data packets bearing the media of the call may traverse the path identified by the solid lines 540 and 542.

Regardless of the path that the data packets bearing the media of the call traverse, data packets sent from the first IP telephony device 502 will pass through the first network interface device 504, and then on to an element of the IP telephony system 120, whether that be the inbound proxy server 520 or the media relay 524. Likewise data packets sent from the second IP telephony device 508 will pass through the second network interface device 506 and on to an element of the IP telephony system 120, whether that be the outbound proxy server 522 or the media relay 524. Data packets being received by the first and second telephony devices 502, 508 will traverse a reverse path that originates with an element of the IP telephony system and which passes through either the first network interface device 504 or the second network interface device 506.

Likewise, if the first IP telephony device 502 wishes to establish a telephone call with the cellular telephone 134 or the analog telephone 132, the data packets bearing the media of the call would traverse a path between the first network interface device 504 and an element of the IP telephony system, whether that be one of the proxy servers, or a media relay. The IP telephone system would then complete the connection to the cellular telephone 134 or the analog telephone through a PSTN or cellular network 130.

Figure 6:
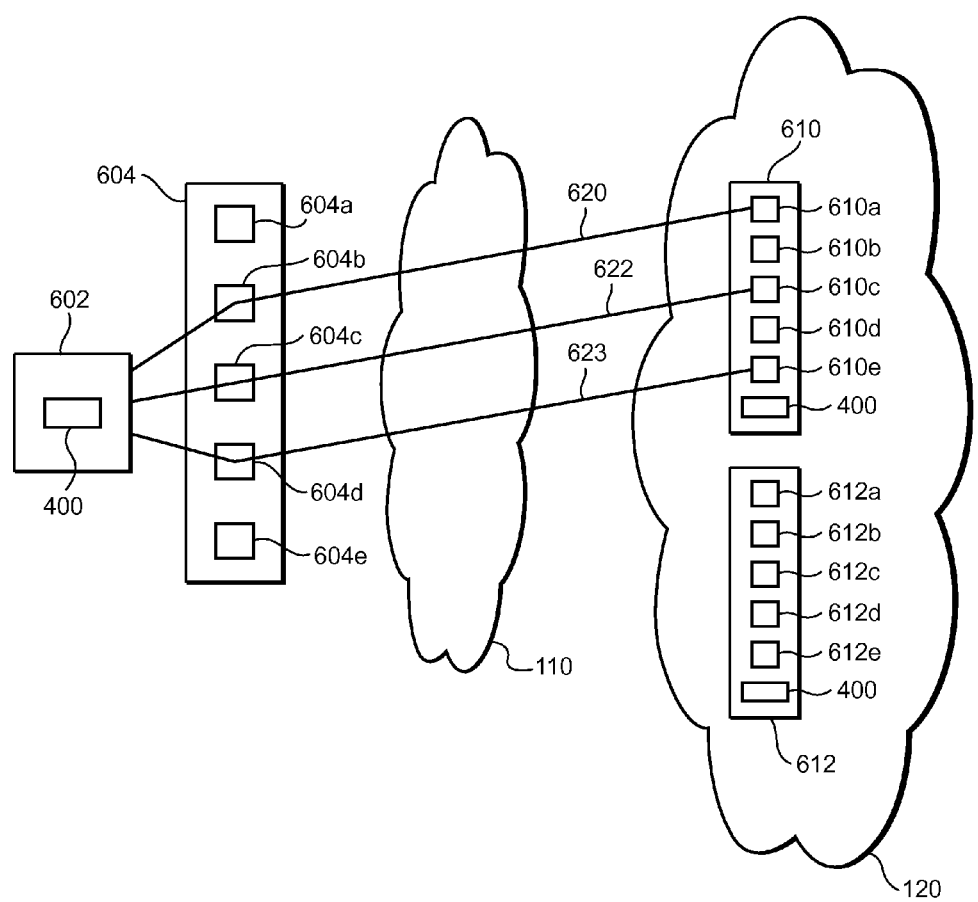
FIG. 6 is a diagram illustrating a first embodiment of the invention where multiple sub-streams of data packets, which together contain the media of an IP telephony communication, are communicated along multiple separate communications channels.

A description of how the multi-channel communications units 400 illustrated in FIG. 4 are used to setup and conduct IP telephony communications in accordance with a first embodiment of the invention will now be provided with reference to FIG. 6. FIG. 6 illustrates a smaller portion of the entire environment shown in FIG. 5. FIG. 6 concentrates only on the link between an IP telephony device 602 and an element 610 of the IP telephony system 120 with which the IP telephony device 602 will communicate during the IP telephone communication.

A multi-channel communications unit 400 is part of the IP telephony device 602. A multi-channel communications device 400 is also present in an element 610 of the IP telephony system 120 with which the IP telephony device 602 will communicate. As explained above, element 610 could be a proxy server or media relay of the IP telephony system.

When a user wishes to place a call through the IP telephony system 120, during call setup, the channel setup unit 402 of the multi-channel setup unit 400 in the IP telephony device 602 communicates with the corresponding channel setup unit 402 of the multi-channel setup unit 400 in the element 610 of the IP telephony system 120 with which it communicates. The two channel setup units operate to establish multiple communications channels between the IP telephony device 602 and the element 610 of the IP telephony system 120.

As illustrated in FIG. 6, a first network interface device 604 provides the IP telephony device with a connection to the Internet 110, and the element 610 in the IP telephony system 120 is likewise in communication with the Internet 110. The network interface device 604 would be assigned a first IP address, and the element 610 of the IP telephony system 120 would be assigned a second IP address. This allows the two devices to address data packets to each other.

As also illustrated in FIG. 6, the network interface device 604 includes multiple ports 604a, 604b, 604c, 604d, 604e. Each port can be used by a different device to obtain access to the Internet. Typically, the IP telephony device 602 would be assigned to only a single port of the network interface device. Likewise, a first element 610 of the IP telephony system 120 includes multiple ports 610a, 610b, 610c, 610d, 610e. Typically, only a single port would be used to communicate with the IP telephony device 602. FIG. 6 illustrates that a second element 612 of the IP telephony system 120 includes multiple ports 612a, 612b, 612c, 612d, 612e. Embodiments of the invention which make use of the second element 612 are discussed below.

In this instance, however, the channel setup units 402 communicate with each other to setup multiple communications channels between the IP telephony device 602 and the element 610 of the IP telephony system 120. In the example illustrated in FIG. 6, a first communications channel 620 is established between port 604b of the network interface device 604 and port 610a of the element 610. A second communications channel 622 is established between port 604c of the network interface device 604 and port 610c of the element 610. A third communications channel 623 is established between port 604d of the network interface device 604 and port 610e of the element 610.

When the IP telephony device needs to communicate a stream of data packets bearing the media of a telephony communication to the element 610 of the IP telephony system, the data stream separation unit 404 in the IP telephony device 602 separates the stream into first, second and third sub-streams. The transmitting unit 410 then sends the first sub-stream over the first communications channel 620, the second sub-stream over the second communications channel 622, and the third sub-stream over the third communications channel 623.

A receiving unit 408 in the element 610 of the IP telephony system 120 receives the three sub-streams and passes the data received data packets to a data-stream re-combining unit 406, which re-assembles the data packets back into a coherently ordered stream.

When the element 610 of the IP telephony system needs to communicate a stream of data packets bearing the media of a telephony communication to the IP telephony device 602, a reverse of the above-described process would be conducted.

In some embodiments, the data stream separation unit 404 would separate the original stream of data packets into approximately evenly divided sub-streams. In other embodiments, the data stream separation unit deliberately divides the original stream of data packets into sub-streams with randomly varying bit transmission rates. As explained above, this may help to mask the data packets.

Although FIG. 6 illustrates a first embodiment where three communications channels are used, only two channels could be used, or more than three channels could be used.

Figure 17:
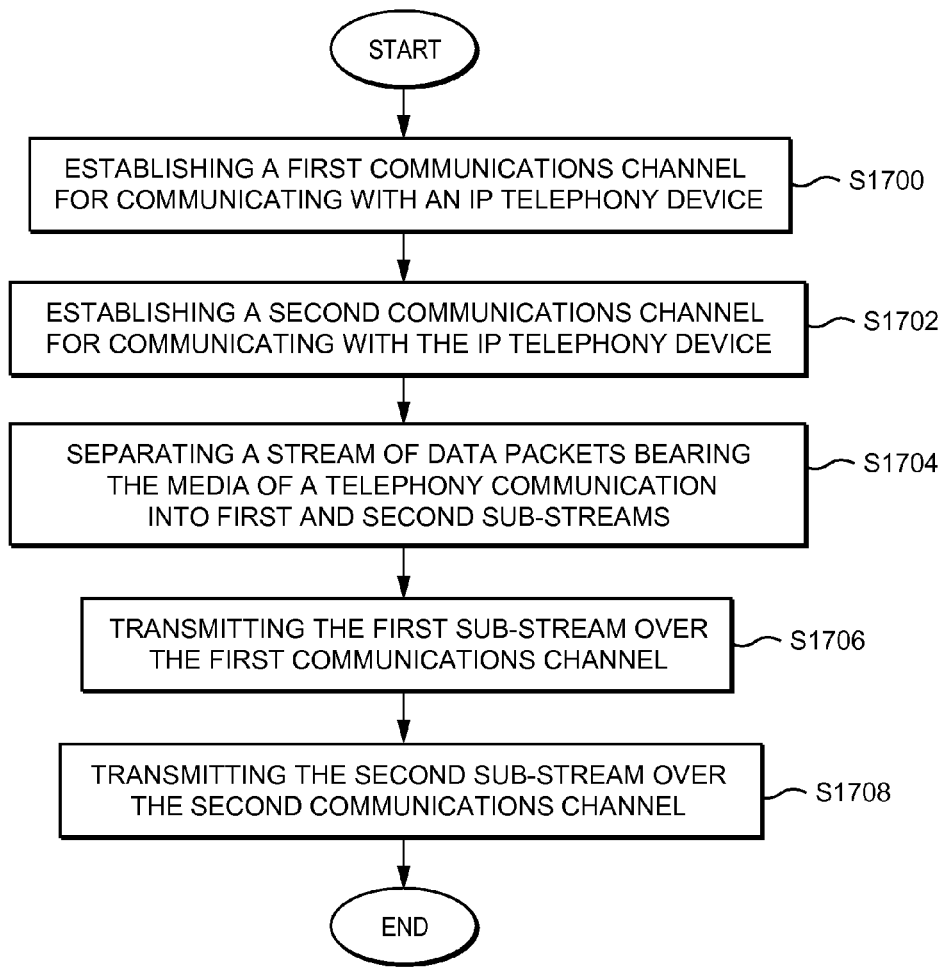
FIG. 17 is a flowchart illustrating steps of another method embodying the invention where sub-portions of a stream of data packets bearing the media of a telephony communication are communicated over separate communication paths.

FIG. 17 illustrates a generalized method of communicating data packets bearing the media of a telephony communication over multiple separate communications channels. The method begins in step S1700 where a first communications channel is established between an IP telephony device and an element of an IP telephony system. In step S1702, a second communications channel is established between the IP telephony device and the element of the IP telephony system. Either of the two devices could initiate that process.

In step S1704, a stream of data packets bearing the media of a telephony communication is separated into first and second sub-streams. In step S1706, the first sub-stream is transmitted over the first communications channel. In step S1708 the second sub-stream is transmitted over the second communications channel.

The generalized method described above in connection with FIG. 17 is subject to a great many variations. For example, the way in which the communications channels are established, and the paths they take can vary considerably. Some examples are given below.

Figure 7:
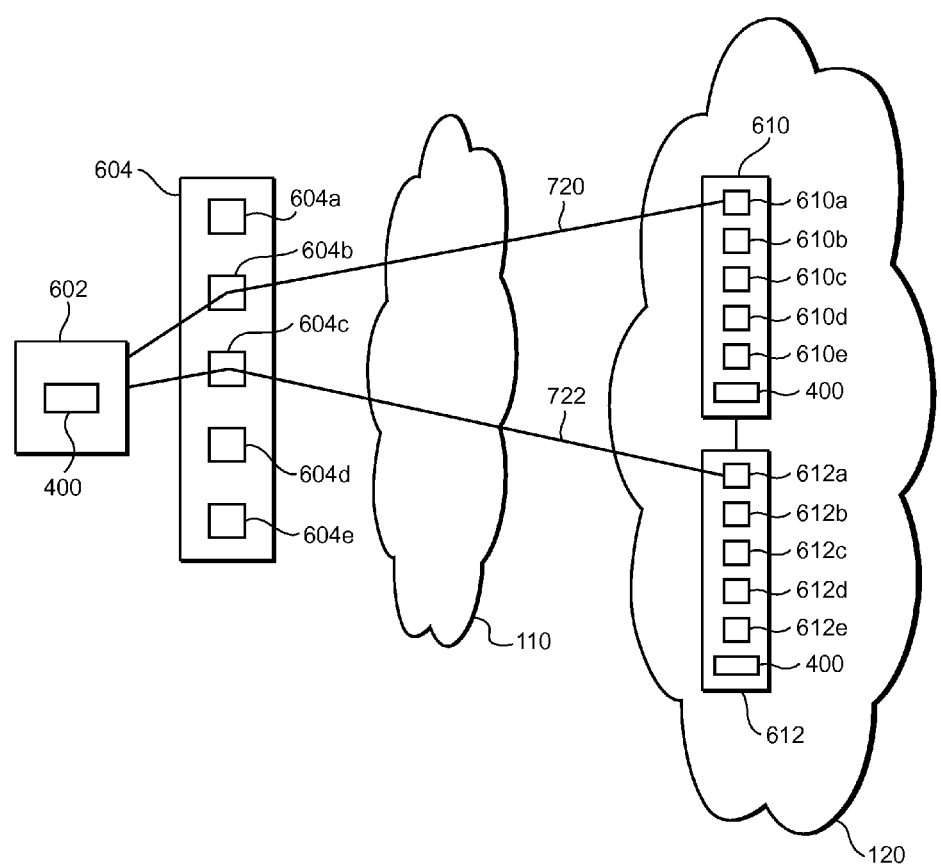
FIG. 7 is a diagram illustrating a second embodiment of the invention where multiple sub-streams of data packets, which together contain the media of an IP telephony communication, are communicated along multiple separate communications channels.

FIG. 7 illustrates a second embodiment of the invention which is similar in some respect to the first embodiment illustrated in FIG. 6. In the embodiment shown in FIG. 7, however, the IP telephony device 602 has established a first communications channel 720 between a port 604b of the network interface device 604 and port 610a of a first element 610 of the IP telephony system. A second communications channel 722 is established between port 604c of the network interface device 604 and a port 612a of a second element 612 of the IP telephony system. The second element 612 then forwards any received data packets to the first element 610, and the data stream re-combining element 406 of the first element 610 re-combines the sub-streams sent over the two communications channels. In this embodiment, there will be different IP addresses associated with the first element 610 and the second element 612 of the IP telephony system. This will make it more difficult for an Internet service provider to determine that data packets passing over the two communications channels 720, 722 are related to one another.

Figure 8:
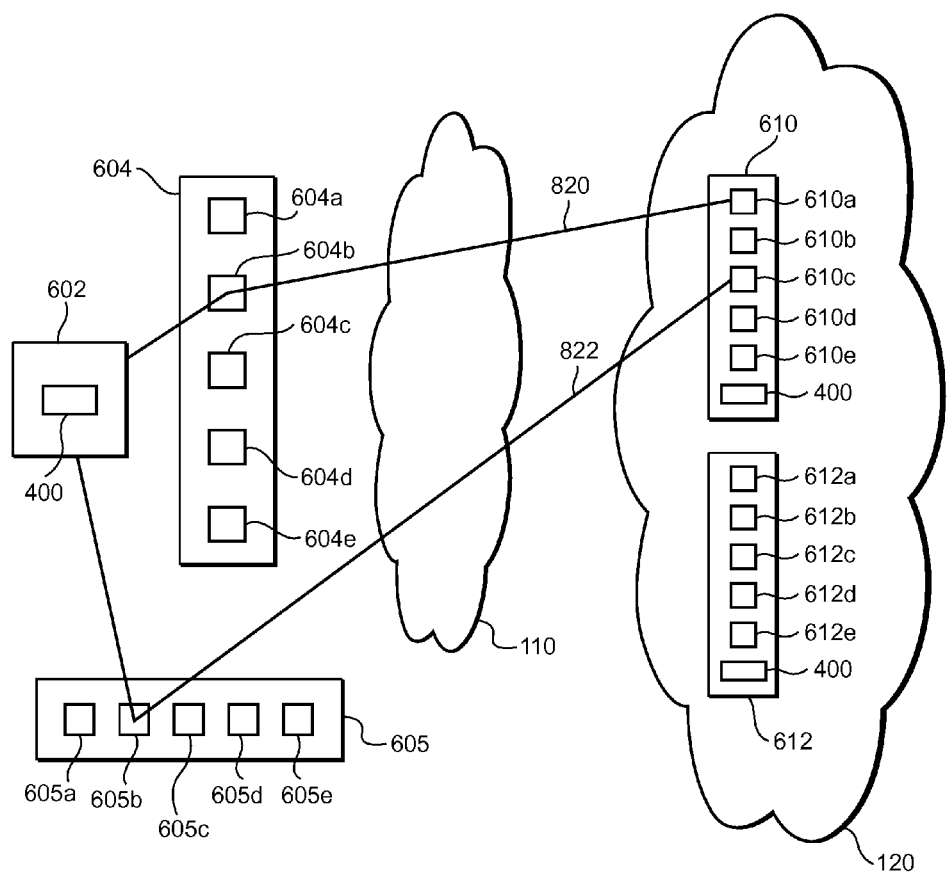
FIG. 8 is a diagram illustrating a third embodiment of the invention where multiple sub-streams of data packets, which together contain the media of an IP telephony communication, are communicated along multiple separate communications channels.

A third embodiment of the invention is illustrated in FIG. 8. In this embodiment, the IP telephony device is in communication with a first network interface device 604 and a second network interface device 605, each of which will have its own assigned IP address. The second network interface device 605 also includes multiple ports 605a, 605b, 605c, 605d and 605e. A first communications channel 820 is established between port 604b of the first network interface device 604 and port 610a of the element 610 of the IP telephony system 120. A second communications channel 822 is established between port 605b of the second network interface device 605 and port 610c of element 610. Here again, because different IP addresses will be associated with the first and second communications channels 820, 822, it will be difficult for an Internet service provider to determine that the sub-streams of data packets passing over the first and second communications channels 820, 822 are related.

Figure 9:
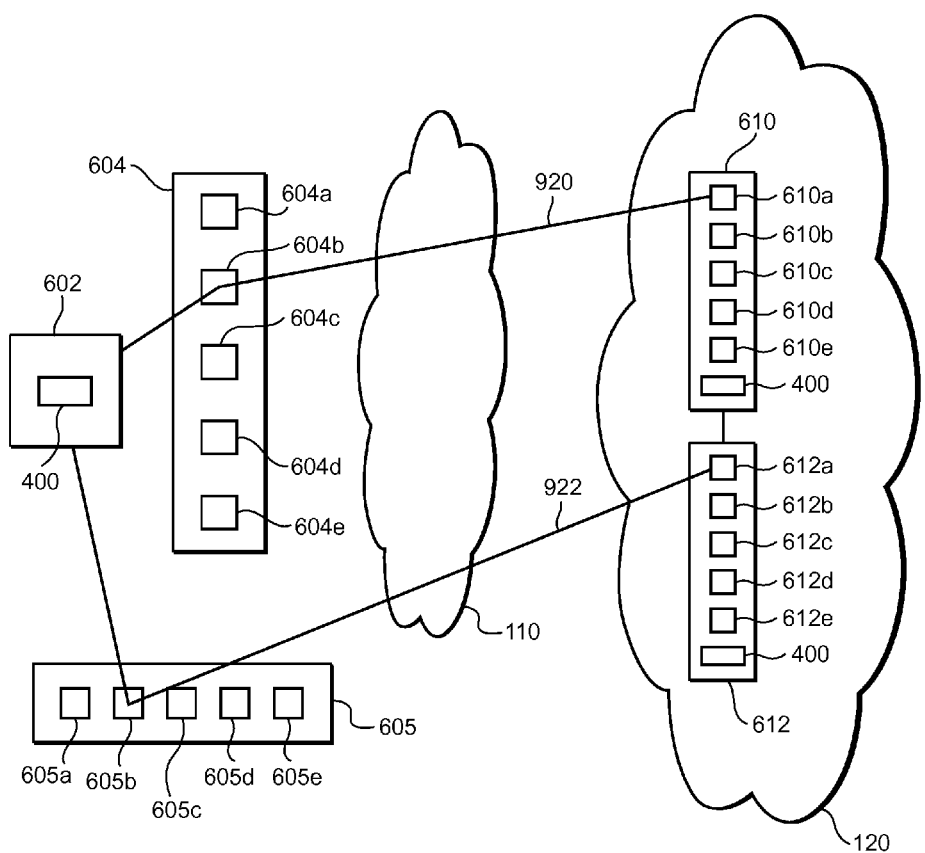
FIG. 9 is a diagram illustrating a fourth embodiment of the invention where multiple sub-streams of data packets, which together contain the media of an IP telephony communication, are communicated along multiple separate communications channels.

FIG. 9 illustrates a fourth embodiment of the invention which is similar to the one illustrated in FIG. 8. In this embodiment, however, a second communication channel 922 is established between the port 605b of the second network interface device 605 and port 612a of the second element 612 of the IP telephony system. The second element 612 forwards data packets received over the second communications channel 922 to the first element 610 for recombination with data packets received over the first communications channel 902. In this instance, there are four completely different IP addresses associated with the sub-streams, making it even more difficult for an Internet service provider to identify the sub-streams as being related.

Figure 10:
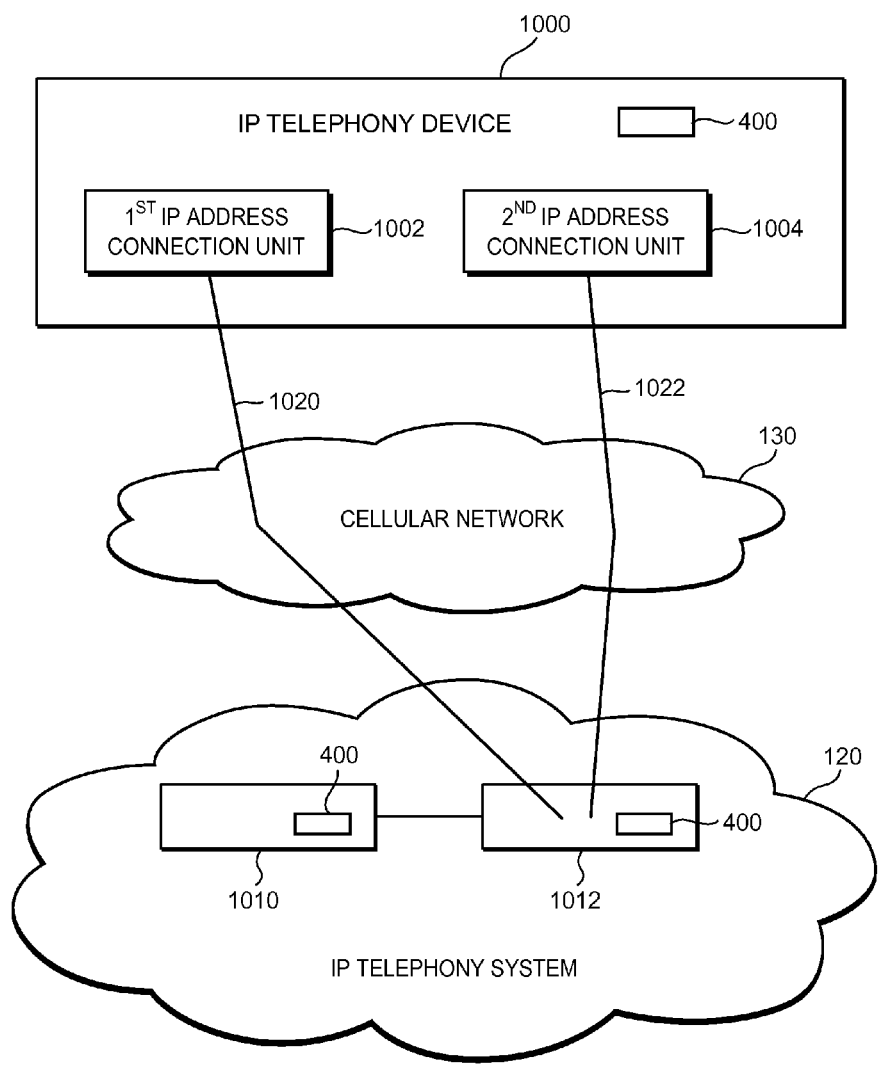
FIG. 10 is a diagram illustrating a fifth embodiment of the invention where multiple sub-streams of data packets, which together contain the media of an IP telephony communication, are communicated along multiple separate communications channels passing through a cellular network.

FIG. 10 illustrates a fifth embodiment of the invention in which an IP telephony device 1000 is capable of establishing and maintaining two separate IP connections, each of which is assigned a different IP address. In this instance, the IP telephony device 1000 establishes two separate data connections through a cellular network using its cellular telephony capabilities.

In this embodiment, a first communication channel 1020 and a second communications channel 1022 are established through the cellular network 130 to a first element 1012 of the IP telephony system 120. The IP telephony system 120 also includes a second element 1010, which will be described below. Data communications are then be accomplished as described above.

Figure 11:
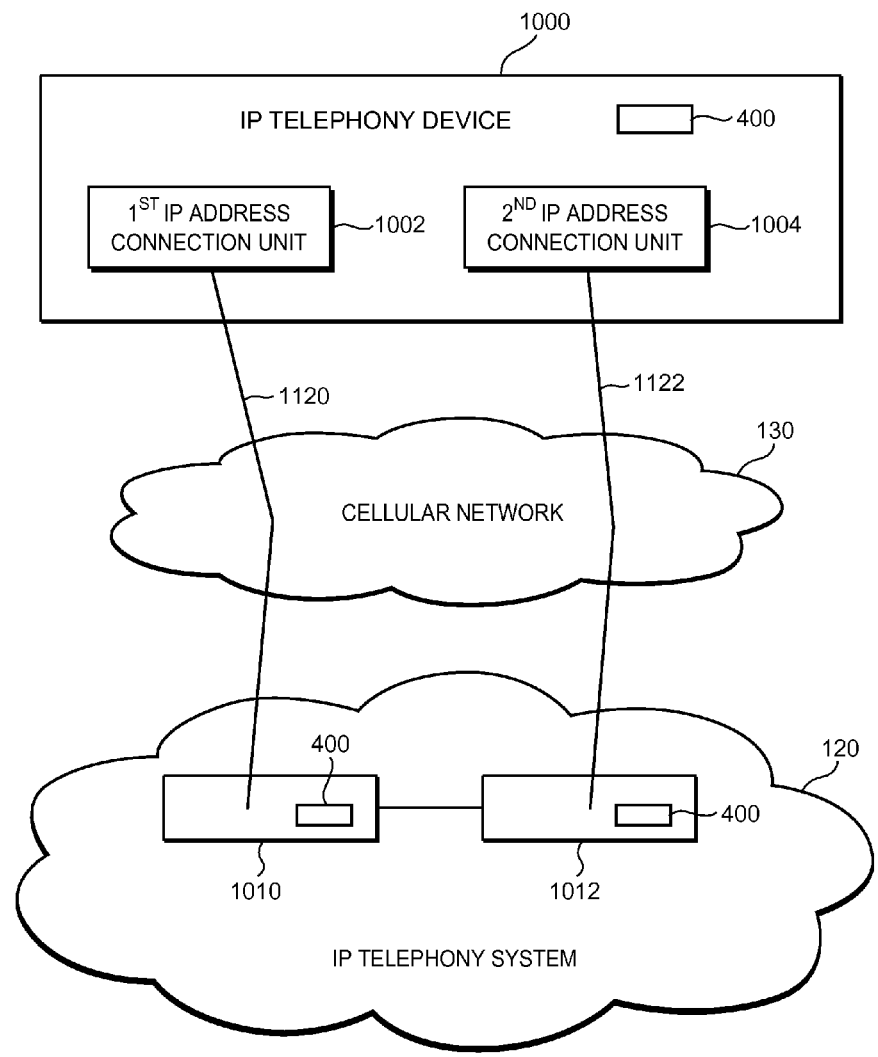
FIG. 11 is a diagram illustrating a sixth embodiment of the invention where multiple sub-streams of data packets, which together contain the media of an IP telephony communication, are communicated along multiple separate communications channels passing through a cellular network.

FIG. 11 illustrates a sixth embodiment of the invention. In the sixth embodiment, the IP telephony device 1000 still establishes first and second communications channels 1120, 1122 through a cellular network 130 via cellular data channels, but the first communications channel 1120 is routed to a second element 1010 of the IP telephony system 120, and the second communications channel 1122 is routed to the first element 1012 of the IP telephony system 120. Either the second element 1010 would forward data packets to the first element 1012, or vice versa, so that the sub-streams of data packets could be re-combined.

Figure 12:
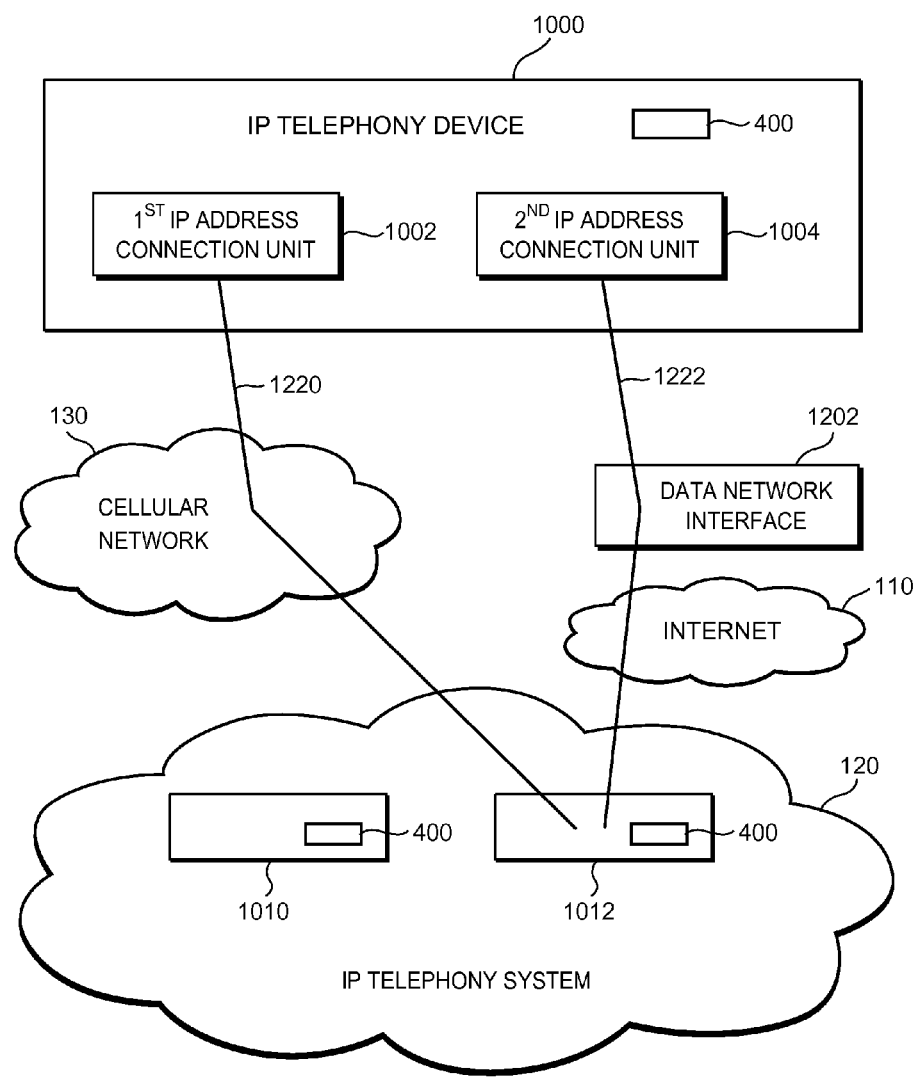
FIG. 12 is a diagram illustrating a seventh embodiment of the invention where multiple sub-streams of data packets, which together contain the media of an IP telephony communication, are communicated along multiple separate communications channels which pass through a cellular network and a separate data network.

In a seventh embodiment of the invention, as illustrated in FIG. 12, the IP telephony device 1000 establishes a first communications channel 1220 to the first element 1012 of the IP telephony system 120 via a data channel of a cellular network 130 using its cellular telephone capabilities. The IP telephony device 1000 also establishes a second communications channel 1222 to the first element 1012 of the IP telephony system 120 through a data interface 1202 coupled to the Internet 110.

Figure 13:
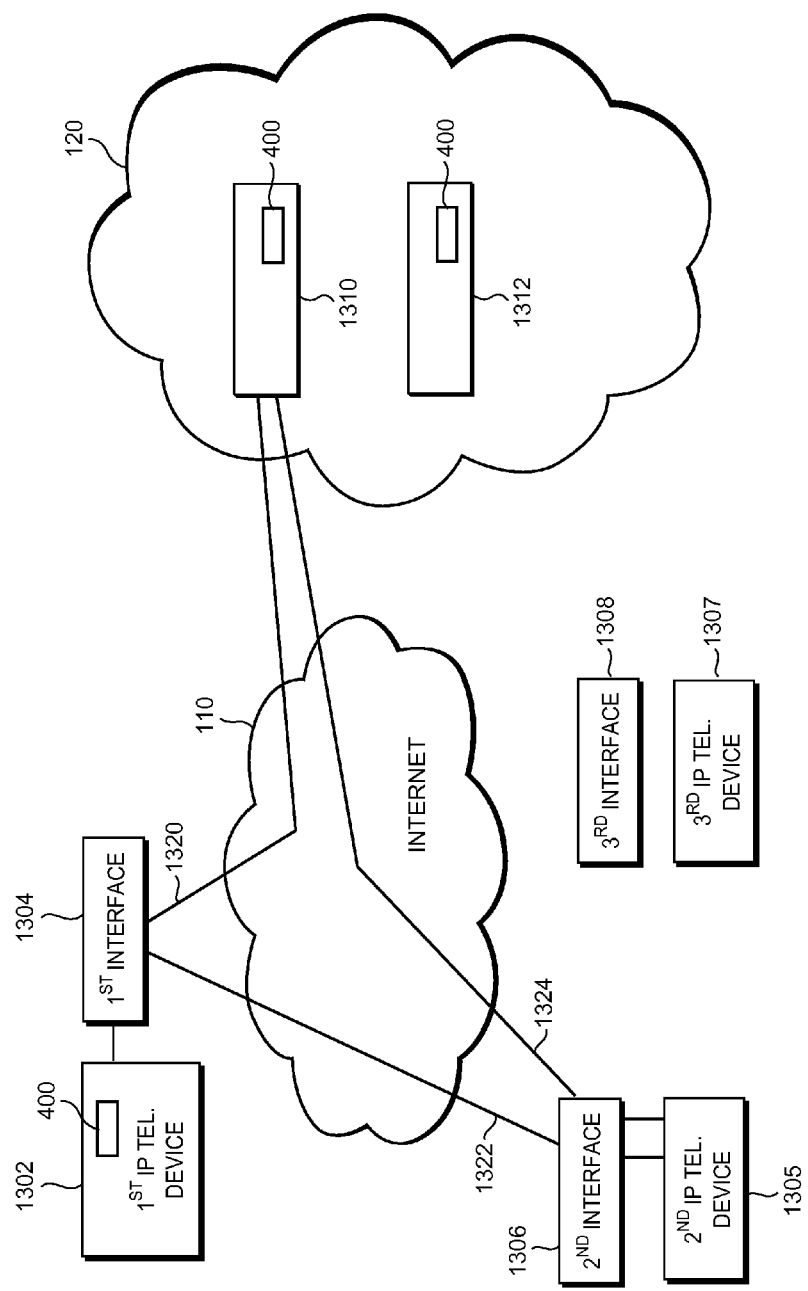
FIG. 13 is a diagram illustrating an eighth embodiment of the invention where multiple sub-streams of data packets originating from a first IP telephony device, which together contain the media of an IP telephony communication, are communicated along multiple separate communications channels, one of which passes through a second IP telephony device.

FIG. 13 illustrates an eight embodiment of the invention, where a communications channel is established through another IP telephony device. In this embodiment, a first IP telephony device 1302 establishes a first communications channel 1320 to a first element 1310 of an IP telephony system 120 via a network interface device 1304 coupled to the Internet 110. But rather than routing the second communications channel through the same path, the first IP telephony device 1302 routes a second communications channel 1322 to a second IP telephony device 1305 which is also coupled to the Internet 110 via a second network interface device 1306. The second IP telephony device 1305 then establishes a third communications channel 1324 to the first element 1310 of the IP telephony system 120 via the Internet 110. The second IP telephony device 1305 simply forwards data packets received from the first communications channel 1322 on through the second communications channel 1324, and vice versa. The IP telephony system includes a second element 1312 which is not used in this embodiment, but which is discussed below.

Figure 14:
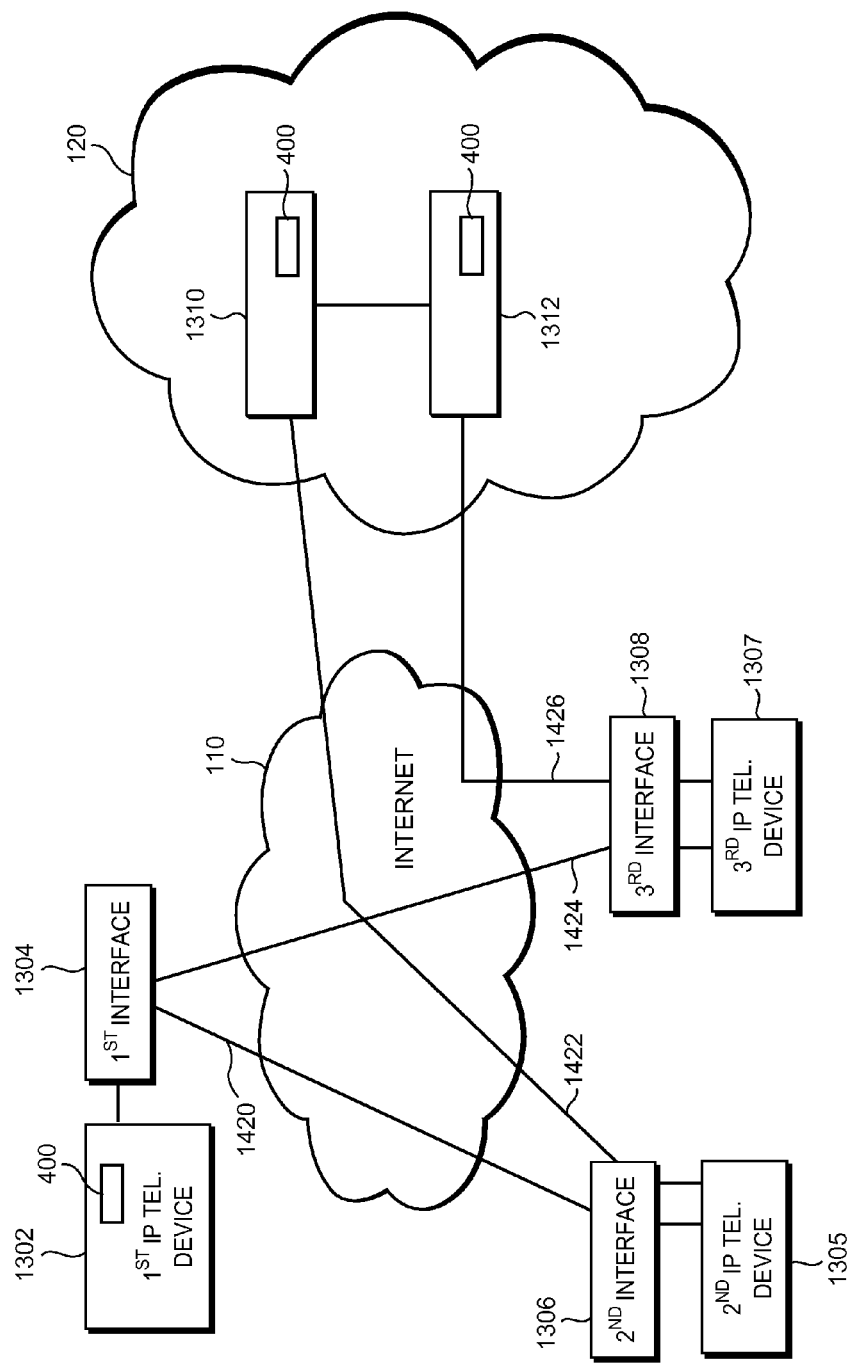
FIG. 14 is a diagram illustrating a ninth embodiment of the invention where multiple sub-streams of data packets originating from a first IP telephony device, which together contain the media of an IP telephony communication, are communicated along multiple separate communications channels, one of which passes through a second IP telephony device, and another of which passes through a third IP telephony device.

FIG. 14 illustrates a ninth embodiment of the invention in which a first communications channel 1420 is established between the first IP telephony device 1302 and the second IP telephony device 1305, and a second communications channel 1422 is established between the second IP telephony device 1305 and a first element 1310 of the IP telephone system 120. The first and second communications channels 1420, 1422 allow data contained in a first sub-stream to be sent from the first IP telephony device 1302 to the first element 1310 of the IP telephony system 120.

A third communications channel 1424 is established between the first IP telephony device 1302 and a third IP telephony device 1307 which communicates through a third network interface device 1308. A fourth communications channel 1426 is established between the third IP telephony device 1307 and the second element 1312 of the IP telephony system 120. The third and fourth communications channels 1424, 1426 are used to send data packets in a second sub-stream between the first IP telephony device 1302 and the second element 1312 of the IP telephony device, which then forwards those data packets on to the first element 1310 for recombination with the data packets in the first sub-stream.

The embodiments illustrated and discussed above are in no way exhaustive and are not intended to be limiting. Any other methods of establishing multiple communications channels to communicate sub-streams of the data packets bearing the media of a telephony communication would also be encompassed by the invention. Likewise, while many of the above-discussed embodiments included two communications channels, alternate embodiments could include more than two communications channels.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of communicating data packets bearing the media of a telephony communication, comprising:
    establishing a first communications channel through a network of a service provider between an element of an Internet protocol (IP) telephony system and a telephony device;
    establishing a second communications channel through the network of the service provider between an element of the IP telephony system and the telephony device, wherein at least one or more of a first endpoint and a second endpoint of the first communication channel has at least one or more of an IP address and port number that differs from a corresponding endpoint of the second communication channel;
    transmitting a first sub-stream of a stream of data packets bearing the media of a telephony communication between the telephony device and the IP telephony system over the first communications channel; and
    transmitting a second sub-stream of the stream of data packets bearing the media of the telephony communication between the telephony device and the IP telephony system over the second communications channel.

2. The method of claim 1, wherein the establishing the first communications channel comprises establishing the first communications channel through a first port of a data network interface device that is in communication with the telephony device, and wherein the establishing the second communications channel comprises establishing the second communications channel through a second port of the data network interface device.

3. The method of claim 1, wherein the establishing the first communications channel comprises establishing the first communications channel between a first port of a data network interface device in communication with the telephony device and a first port of an element of an IP telephony system, and wherein the establishing the second communications channel comprises establishing the second communications channel between a second port of the data network interface device and a second port of the element of the IP telephony system.

4. The method of claim 1, wherein the establishing the first communications channel comprises establishing the first communications channel between a first port of a data network interface device in communication with the telephony device and a first element of an IP telephony system, and wherein the establishing the second communications channel comprises establishing the second communications channel between a second port of the data network interface device and a second element of the IP telephony system.

5. The method of claim 1, wherein the establishing the first communications channel comprises establishing the first communications channel between a first data network interface device in communication with the telephony device and an element of the IP telephony system, and wherein the establishing the second communications channel comprises establishing the second communications channel between a second data network interface device in communication with the telephony device and an element of the IP telephony system.

6. The method of claim 1, wherein the establishing the first communications channel comprises establishing the first communications channel between a first data network interface device in communication with the telephony device and a first port of an element of the IP telephony system, and wherein the establishing the second communications channel comprises establishing the second communications channel between a second data network interface device in communication with the telephony device and a second port of the element of the IP telephony system.

7. The method of claim 1, wherein the establishing the first communications channel comprises establishing the first communications channel between a first data network interface device in communication with the telephony device and a first element of the IP telephony system, and wherein the establishing the second communications channel comprises establishing the second communications channel between a second data network interface device in communication with the telephony device and a second element of the IP telephony system.

8. The method of claim 1, wherein the establishing the first communications channel comprises establishing the first communications channel between an element of the IP telephony system and a first IP address associated with the telephony device, and wherein the establishing the second communications channel comprises establishing the second communications channel between an element of the IP telephony system and a second IP address associated with the telephony device.

9. The method of claim 8, wherein the first IP address and the second IP address are both assigned to the telephony device.

10. The method of claim 8, wherein the first IP address is assigned to a first data network interface device in communication with the telephony device and wherein the second IP address is assigned to a second network interface device in communication with the telephony device.

11. The method of claim 10, wherein the first and second data network interface devices are both wireless access points.

12. The method of claim 8, wherein the first IP address is associated with a cellular data channel connection that is maintained by the telephony device and wherein the second IP address is associated with a second cellular data channel that is maintained by the telephony device.

13. The method of claim 8, wherein the first IP address is associated with a cellular data channel connection that is maintained by the telephony device, and wherein the second IP address is associated with a data network interface device that is in communication with the telephony device.

14. The method of claim 8, wherein the telephony device comprises a first telephony device, wherein the first IP address is associated with a first data network interface device that is in communication with the first telephony device, and wherein the second IP address is associated with at least one of a second telephony device and a data network interface device that is in communication with the second telephony device.

15. The method of claim 8, wherein the telephony device comprises a first telephony device, wherein the first IP address is associated with a first data network interface device that is in communication with at least one of a second telephony device and a data network interface device that is in communication with the second telephony device, and wherein the second IP address is associated with at least one of a third IP telephony device and a third data network interface device that is in communication with the third telephony device.

16. The method of claim 1, wherein the establishing the first communications channel comprises establishing the first communications channel between a first IP address associated with the telephony device and a first port of an element of the IP telephony system, and wherein the establishing the second communications channel comprises establishing the second communications channel between a second IP address associated with the telephony device and a second port of the element of the IP telephony system.

17. The method of claim 1, wherein the establishing the first communications channel comprises establishing the first communications channel between a first IP address associated with the telephony device and a first element of the IP telephony system, and wherein the establishing the second communications channel comprises establishing the second communications channel between a second IP address associated with the telephony device and a second element of the IP telephony system.

18. The method of claim 1, wherein the transmitting the first sub-stream to the telephony device over the first communications channel comprises transmitting the first sub-stream at a first bit transmission rate, and wherein the transmitting the second sub-stream to the telephony device over the second communications channel comprises transmitting the second sub-stream at a second bit transmission rate.

19. The method of claim 18, further comprising causing the first and second bit transmission rates to vary over time.

20. The method of claim 18, further comprising causing the first and second bit transmission rates to randomly vary over time.

21. The method of claim 18, further comprising causing both the first and second bit transmission rates to vary over time, and wherein the first bit transmission rate varies in a different fashion than the second bit transmission rate.

22. The method of claim 1, further comprising separating the stream of data packets bearing the media of a telephony communication into at least the first and second sub-streams.

23. The method of claim 22, wherein the separating a stream of data packets bearing the media of a telephony communication into at least the first and second sub-streams comprises randomly assigning data packets from the stream into the first and second sub-streams.

24. The method of claim 23, wherein the random assignment of data packets into the first and second sub-streams causes the number of data packets that are assigned into each of the first and second sub-streams, per unit of time, to randomly vary.

25. The method of claim 1, further comprising:
receiving a first sub-stream of a stream of data packets bearing the media of a telephony communication from the telephony device over the first communications channel; and receiving a second sub-stream of the stream of data packets bearing the media of the telephony communication from the telephony device over the second communications channel.

26. The method of claim 25, further comprising combining the first and second sub-streams of data packets received from the telephony device to re-create the stream of data packets bearing the media of the telephony communication.

27. The method of claim 1, further comprising:
establishing multiple communications channels including the first communications channel and the second communications channel; and then when a stream of the data packets needs to be communicated,
separating the stream into a respective multiple number of sub-streams corresponding to the multiple communication channels;
transmitting the multiple sub-streams of the stream of data packets bearing the media of the telephony communication over the respective communications channels including transmitting a first sub-stream over the first communications channel and transmitting a second sub-stream over the second communications channel.

28. A system for communicating data packets bearing the media of a telephony communication, comprising:
means for establishing a first communications channel through a network of a service provider between an element of an Internet protocol (IP) telephony system and a telephony device;
means for establishing a second communications channel through the network of a service provider between an element of the IP telephony system and the telephony device, wherein at least one or more of a first endpoint and a second endpoint of the first communication channel has at least one or more of an IP address and port number that differs from a corresponding endpoint of the second communication channel;
means for transmitting a first sub-stream of a stream of data packets bearing the media of a telephony communication between the telephony device and the IP telephony network over the first communications channel; and
means for transmitting a second sub-stream of the stream of data packets bearing the media of the telephony communication between the telephony device and the IP telephony network over the second communications channel.

29. The system of claim 28, further comprising
means for establishing multiple communications channels including the first communications channel and the second communications channel through the network of the service provider between the Internet protocol (IP) telephony system and the telephony device;
means for separating the stream into a respective multiple number of sub-streams corresponding to the multiple communication channels;
means for transmitting the multiple sub-streams of the stream of data packets bearing the media of the telephony communication over the respective communications channels including transmitting a first sub-stream over the first communications channel and transmitting a second sub-stream over the second communications channel.

30. A system for communicating data packets bearing the media of a telephony communication, comprising:
a channel setup unit configured to establish a first communications channel through a network of the service provider between an element of an Internet protocol (IP) telephony system and a telephony device and that establishes a second communications channel through the network of the service provider between an element of the IP telephony system and the telephony device, wherein at least one or more of a first endpoint and a second endpoint of the first communication channel has at least one or more of an IP address and port number that differs from a corresponding endpoint of the second communication channel; and
a transmitting unit configured to transmit a first sub-stream of a stream of data packets bearing the media of a telephony communication between the telephony device and IP telenhony system over the first communications channel, and that transmits a second sub-stream of the stream of data packets bearing the media of the telephony communication between the telephony device and the IP telephony system over the second communications channel.

31. The system of claim 30, further comprising a receiving unit that receives a first sub-stream of a stream of data packets bearing the media of a telephony communication from the telephony device over the first communications channel and that receives a second sub-stream of the stream of data packets bearing the media of the telephony communication from the telephony device over the second communications channel.

32. The system of claim 31, further comprising a data stream re-combining unit that combines the first and second sub-streams of data packets received from the telephony device to re-create the stream of data packets bearing the media of the telephony communication.

33. The system of claim 30, wherein the transmitting unit transmits the first sub-stream to the telephony device over the first communications channel a first bit transmission rate, and wherein transmitting unit transmits the second sub-stream to the telephony device over the second communications channel at a second bit transmission rate.

34. The system of claim 33, wherein the transmitting unit causes the first and second bit transmission rates to vary over time.

35. The system of claim 33, wherein the transmitting unit causes the first and second bit transmission rates to randomly vary over time.

36. The system of claim 33, wherein the transmitting unit causes both the first and second bit transmission rates to vary over time, and wherein the first bit transmission rate varies in a different fashion than the second bit transmission rate.

37. The system of claim 30, further comprising a data stream separation unit that separates the stream of data packets bearing the media of a telephony communication into the first and second sub-streams.

38. The system of claim 30, wherein the separation unit separates the stream of data packets bearing the media of a telephony communication into at least the first and second sub-streams by randomly assigning data packets from the stream into the first and second sub-streams.

39. The system of claim 38, wherein the random assignment of data packets into the first and second sub-streams causes the number of data packets that are assigned into each of the first and second sub-streams, per unit of time, to randomly vary.

40. The system of claim 30, wherein the channel setup unit is configured to establishing multiple communications channels through the network of the service provider between the Internet protocol (IP) telephony system and the telephony device;

a data stream separation unit configured to separate separating the stream into a respective multiple number of sub-streams corresponding to the multiple communication channels; and wherein the transmitting unit is configured to transmit the multiple sub-streams of the stream of data packets bearing the media of the telephony communication over the respective communications channels including transmitting a first sub-stream over the first communications channel and transmitting a second sub-stream over the second communications channel.

* * * * *